Sept. 6, 1938.   F. W. HARALSON   2,129,352

SHEARS

Filed April 12, 1937

INVENTOR
Fred W. Haralson
BY
Wheeler, Wheeler & Wheeler
ATTORNEYS

Patented Sept. 6, 1938

2,129,352

UNITED STATES PATENT OFFICE 2,129,352

SHEARS

Fred W. Haralson, Black River Falls, Wis.

Application April 12, 1937, Serial No. 136,275

5 Claims. (Cl. 164—44)

My invention relates to improvements in shears.

The object of my invention is to provide shears for use in cutting heavy materials.

More particularly stated, it is the object of my invention to provide shears mounted upon a bed and equipped whereby to advance the shearing members mechanically and positively between shearing operations.

In the drawing.

Like parts are designated by the same reference characters throughout the several views.

Figure 1:
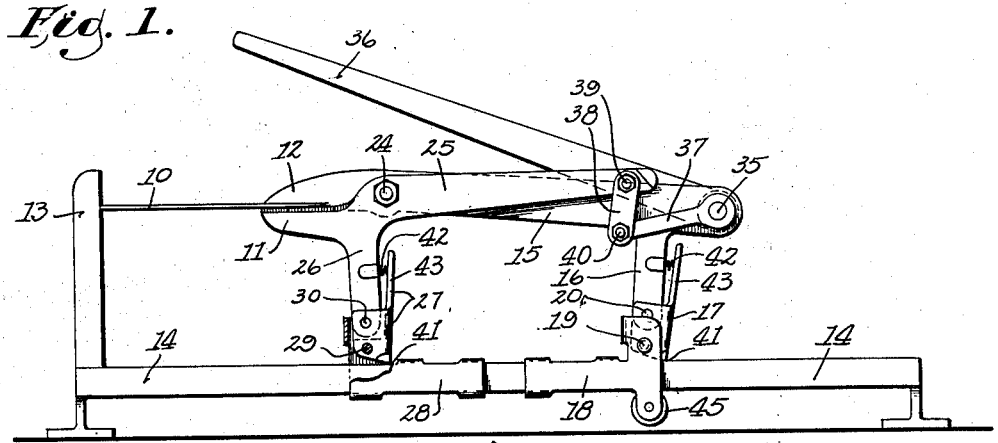
Figure 1 is a side elevation of my shears with the parts in position at the close of a shearing operation.
Figure 2:
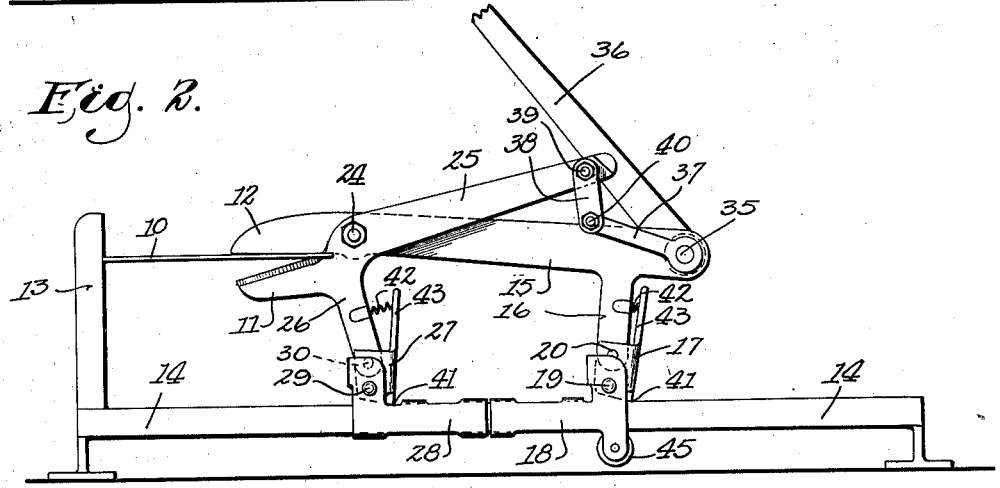
Figure 2 is a view similar to Fig. 1, but with the parts in position for a shearing operation.
Figure 3:
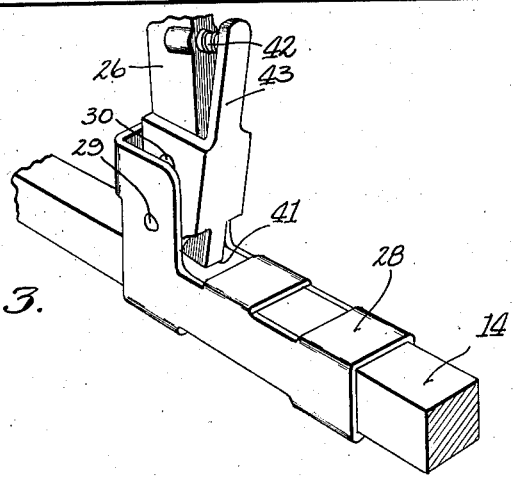
Figure 3 is a perspective of the lower portion of the movable blade extension and showing the parts associated with the bed of my shearing mechanism.

I have shown my shears or "walking shears", as I have sometimes called them, in operation upon a heavy sheet 10 of sheet metal and in Figs. 1 and 2, the sheet metal is engaged between an oscillatable blade 11 and a non-oscillatable blade 12, the edges of which are suitably sharpened in accord with standard practice in the trade. When the oscillatable blade 11 is closed toward the other blade 12, which I shall hereafter term the "fixed" blade, there is a natural tendency for the sheet 10 to be thrust out of the bite of the blades. I therefore provide a work abutment 13 rigidly secured to a bed 14. It is upon this bed that my shears are mounted for operation.

The fixed blade 12 forms the forward tip of a bar 15 with a leg 16 supported by a pawl 17 which is in turn supported by a box-slide 18 in slidable engagement with the bed 14. The pawl 17 is in pivotal relation to the slide 18 upon pin 19, and the leg 16 of the bar 15 is in pivotal relation to the pawl upon pin 20. The oscillatable shear blade 11 forms a part of a long lever 25 which is in pivotal relation to the bar 15 upon pivot pin 24. The bar 25 has a leg 26 supported upon a pawl 27 which in turn is supported upon a box-slide 28, pivot pins 29 and 30 performing the same office as that performed by the pivot pins 19 and 20 heretofore described.

At the rearward end of the bar 15 I provide a fulcrum pin 35 upon which is mounted an operating handle 36 and a short lever 37, the parts 35, 36, and 37 being rigidly keyed or secured together to move as a unit. A link 38 mounted to rotate freely upon bolts 39 and 40 connects the lever 25 and the short lever 37.

Each of the pawls 17 and 27 is shaped as shown clearly in the drawing whereby to provide for frictional engagement of a point 41 with the bed 14 to resist and actually block movement in response to the tendency of the jaws or blades 11—12 to slide off of the work sheet 10. This tendency is assisted by springs 42 between the handles 43 of the pawls and the legs 26 or 16 with which they are associated.

A roller at 45 carried by the box-slide 18 assists in the free forward movement of the box-slide.

The operation of my shears is as follows:

Assuming that the shears have completed a cutting operation upon the work sheet 10 as shown in Fig. 1, the operating handle 36 is swung to the position shown in Fig. 2 upon the fulcrum pin 35, thus oscillating the blade 11 about pin 24. This of course causes the leg 26 to oscillate to the position shown in Fig. 2 and since the pawl 27 in engagement at 40 with the bed 14 will not permit retrograde movement of the slide 28, the entire mechanism consisting of the bar 15 with its leg 16 and a box-slide 18 and all associated parts are drawn forwardly, the point 40 of the pawl 17 being slidably moved forwardly with the box-slide 18.

The operating handle 36 is then swung downwardly to accomplish the usual shearing operation and during this operation the pawl 17 prevents retrograde movement of the bar 15 and the forward oscillating movement of the leg 26 is permitted by the pawl 27, thus sliding the box-slide 28 forwardly while the actual cutting of the sheet 10 is taking place.

The cycle of operations is thus complete and the operating handle 36 may be repeatedly swung about fulcrum pin 35 to complete the shearing operation in a series of forward motions which may be likened to a walking sequence, advance of the relatively fixed blade 12 being accomplished between cutting or shearing operations.

I claim:

1. In a shearing mechanism having a base and relatively movable blades for advance with respect thereto, a dog for one of the blades to engage the base and prevent retrograde movement, and a dog for the other blade to prevent retrograde movement thereof, whereby in the relative movement of the blades to advance them relative to said base.

2. In a device of the character described, a base, a non-oscillatable shear blade having an extension toward said base, with a pawl for engagement with the base, an oscillatable blade for cooperation with the non-oscillatable blade and provided with an extension to said base and provided with a pawl for engagement therewith whereby in the movement of the oscillatable blade to advance the blades in the cooperative movement thereof.

3. In a shearing mechanism having a base and relatively movable blades for advance with respect thereto, a dog for one of the blades to engage the base and to prevent retrograde movement, and a dog for the other blade to prevent retrograde movement thereof whereby in the relative movement of the blades to advance them relative to said base, one of said dogs being associated with a guide associated with said base.

4. In a shearing mechanism having a base and relatively movable blades for advance with respect thereto, said base having a guide associated with a dog for interengagement of the guide and the base, and means for interengagement of the dog and said blade whereby directional stresses imposed upon the blade will cause the dog to engage the base to prevent movement of the blade and said guide with reference to the base.

5. In a shearing mechanism having a base and relatively movable blades for advance with respect thereto, legs upon said blades, guides upon said base, each of said guides being provided with a pivotally mounted dog, and each of said legs being pivotally associated with one of said dogs whereby in certain directional movements of said legs to cause said dogs to engage the base.

FRED W. HARALSON.